US007814321B2

(12) United States Patent
Challener et al.

(10) Patent No.: US 7,814,321 B2
(45) Date of Patent: Oct. 12, 2010

(54) SYSTEM AND METHOD FOR PROTECTING DISK DRIVE PASSWORD WHEN BIOS CAUSES COMPUTER TO LEAVE SUSPEND STATE

(75) Inventors: David Carroll Challener, Raleigh, NC (US); Howard Jeffrey Locker, Cary, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 826 days.

(21) Appl. No.: 11/788,654

(22) Filed: Apr. 19, 2007

(65) Prior Publication Data
US 2008/0263378 A1 Oct. 23, 2008

(51) Int. Cl.
*H04L 9/32* (2006.01)
(52) U.S. Cl. .................. 713/168; 713/155; 713/159; 713/161; 713/169; 713/170; 726/19; 726/21
(58) Field of Classification Search ................ 713/155, 713/159, 161, 168, 169, 170; 726/19, 21
See application file for complete search history.

(56) References Cited

U.S. PATENT DOCUMENTS

| 7,308,250 | B2 * | 12/2007 | Khare et al. | 455/411 |
| 7,657,743 | B2 * | 2/2010 | Miyazawa et al. | 713/168 |
| 2003/0212894 | A1 * | 11/2003 | Buck et al. | 713/184 |
| 2006/0179293 | A1 * | 8/2006 | O'Connor et al. | 713/1 |
| 2006/0227378 | A1 * | 10/2006 | Mihira | 358/1.16 |
| 2008/0028447 | A1 * | 1/2008 | O'Malley et al. | 726/6 |

* cited by examiner

*Primary Examiner*—Abdelmoniem Elamin
(74) *Attorney, Agent, or Firm*—John L. Rogitz

(57) ABSTRACT

To unlock a HDD when a computer is in the suspend state, at both BIOS and the HDD a secret is combined with a password to render a new one-time password. BIOS sends its new one-time password to the HDD which unlocks itself only if a match is found. The new one-time password is then saved as an "old" password for subsequent combination with the secret when coming out of subsequent suspend states. In this way, if a computer is stolen the thief cannot sniff the bus between BIOS and the HDD to obtain a password that is of any use once the computer ever re-enters the suspend state.

20 Claims, 3 Drawing Sheets

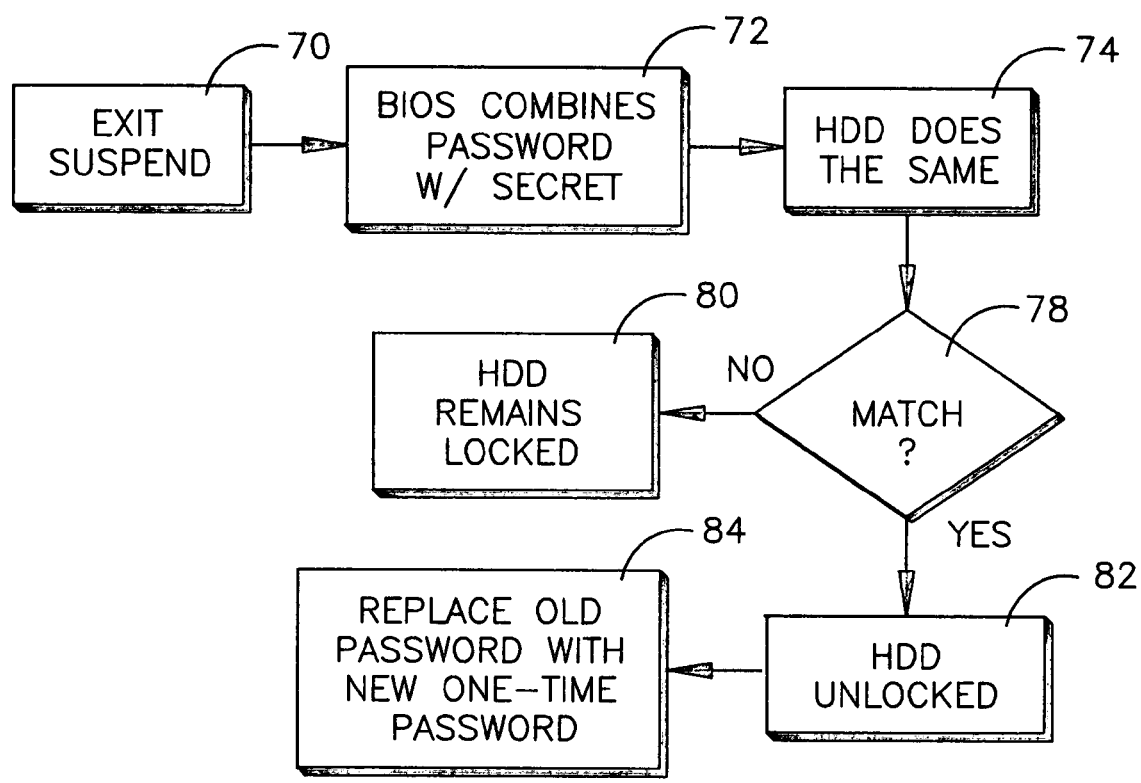

SYSTEM AND METHOD FOR PROTECTING DISK DRIVE PASSWORD WHEN BIOS CAUSES COMPUTER TO LEAVE SUSPEND STATE

I. FIELD OF THE INVENTION

The present invention relates generally to protecting disk drive passwords in portable computers when the BIOS causes the computer to leave the suspend state.

II. BACKGROUND OF THE INVENTION

When a personal computer is turned on, a basic input-output system ("BIOS") that is stored in non-volatile solid state memory of the computer is invoked to begin what is known as a "boot" process, in which various initialization chores are undertaken. Among the most important of these chores is the copying of an operating system from disk storage of the computer over into a solid state memory of the computer, for execution of the operating system by the processor of the computer when the computer is being used. When the computer is turned off or when it is "re-booted", the operating system is flushed from the memory.

Further, when the personal computer is turned on or "re-booted", the disk storage user password (referred to as "user password" herein, it being understood that an operating system typically also has a different user password) that is required to gain access to data on the disk storage is sent from BIOS. When a user enters the password to gain access to data on the personal computer, the disk storage will recognize the password based on the password sent and the one stored locally on the disk storage.

Similarly, when the personal computer exits a "suspended" state and returns to its functional state, the same user password must be entered as outlined above. A "suspended" state differs from the normal "off" state. When the personal computer is turned off, the copy of the operating system stored in the solid state memory is flushed from solid state memory. When the personal computer enters the suspended state, the current copy of the operating system is kept in the solid state memory, thereby preserving any processes the user was using prior entering the suspended state. Exiting the suspended state occurs faster than starting the personal computer from the off state and allows the user to immediately resume whatever processes were being performed prior to entering the suspended state.

Currently, an unauthorized individual may gain access to the user's password when the system returns from a suspended state, as can happen when a laptop computer is stolen while in the suspend state, giving the thief time and opportunity to operate the computer. The thief can steal the password by monitoring the disk storage bus (serial ATA bus or PCI bus, for example) and intercepting the password when the BIOS sends a copy of the user password to the disk storage. A serial ATA bus is simply an electrical pathway through which information is exchanged between the disk storage and an application being executed by the computer processor. Personal security and data may be compromised when an unauthorized individual gains access to the user's personal computer by intercepting the user's password. There is currently no method for preventing an unauthorized individual from intercepting the user's password through the process discussed above. The present invention provides a method for securing the user's password so as to not be hijacked through the serial ATA bus or other disk storage bus.

SUMMARY OF THE INVENTION

A method requires combining, with a secret to render a first one-time password, a password for unlocking a hard disk drive (HDD) that is associated with a computer. The method also includes storing the first one-time password and secret with a basic input-output system (BIOS) associated with the computer. The first one-time password and secret are also stored on the HDD. In response to the computer emerging from a suspend state at a first time, at the BIOS the first one-time password is combined with the secret to render a second one-time password that is sent to the HDD. Likewise, at the HDD the first one-time password is combined with the secret to render a second one-time password, and only if the second one-time password received by the HDD from BIOS matches the second one-time password generated by the HDD is access to the HDD permitted.

Subsequently, the second one-time password is stored at both locations, so that in response to the computer emerging from a suspend state at a second time, at the BIOS the second one-time password is combined with the secret to render a third one-time password, which is sent to the HDD, with HDD access being permitted upon emergence from the second suspend state only if a proper third one-time password is received at the HDD.

In another aspect, a computer has a HDD and an operating system configured to enter a suspend state upon the elapse of a period of no user input. The operating system is configured to exit the suspend state in response to a user input signal. Data on the HDD is accessible in response to the operating system exiting the suspend state only upon proper reception by the HDD of a one-time password. The one-time password subsequently is not useful for rendering data on the HDD accessible when the operating system exits subsequent suspend states.

In yet another aspect, a computer system includes an operating system programmed with means for entering a suspend state upon at least one predetermined criterion being met. The system also includes a hard disk drive (HDD) and means for permitting access to the HDD when the operating system emerges from a first suspend state but not from a second suspend state after the first suspend state.

The details of the present invention, both as to its structure and operation, can best be understood in reference to the accompanying drawings, in which like reference numerals refer to like parts, and in which:

BRIEF DESCRIPTION OF THE DRAWINGS

FIGS. 3 and 4 are flow charts of non-limiting logic in accordance with present principles, with various portions of the logic being performed by the computer and other portions by the HDD.

DETAILED DESCRIPTION OF THE PREFERRED EMBODIMENT

Figure 1:
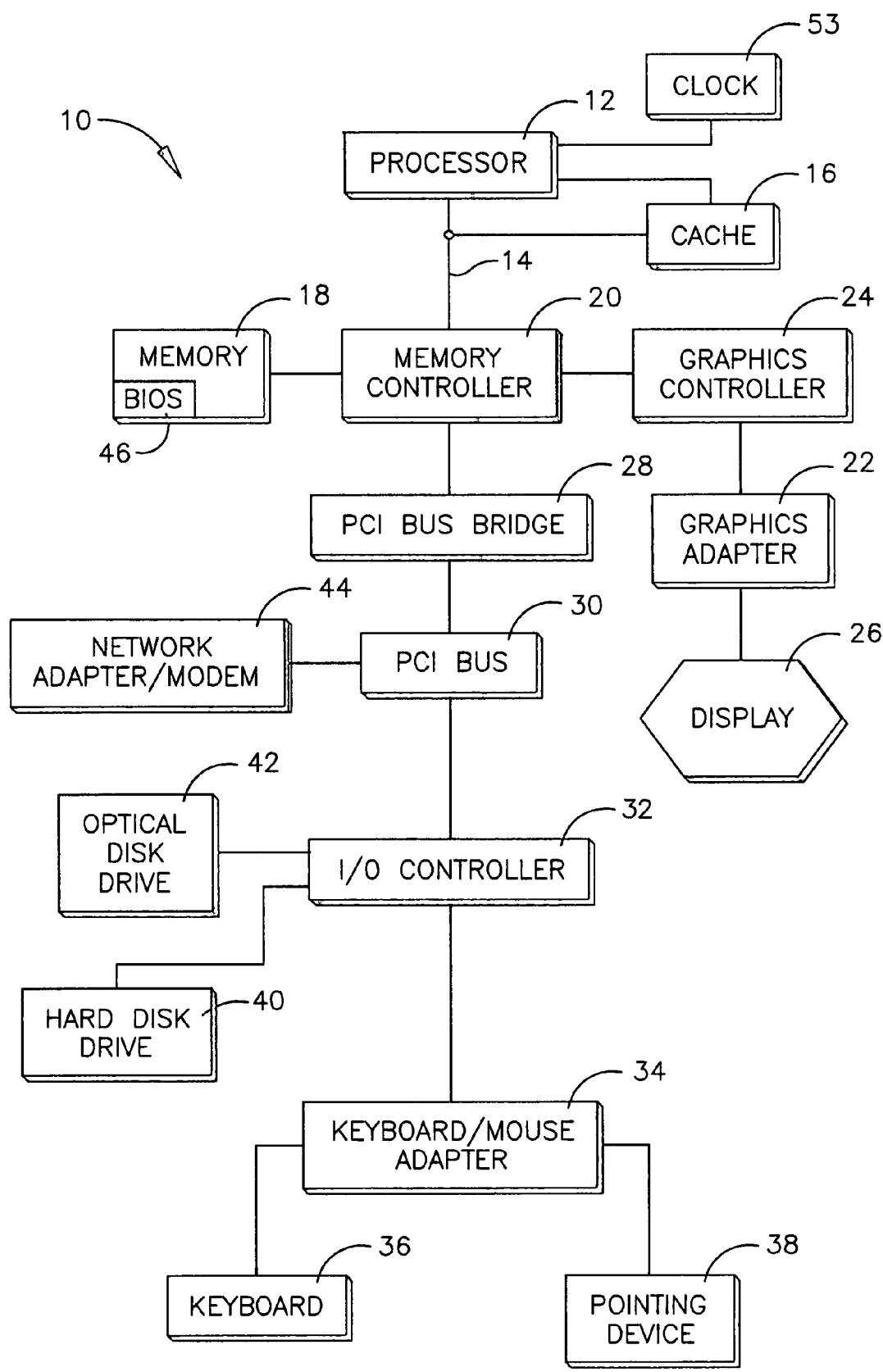
FIG. 1 is a block diagram of a non-limiting computer that can use the present invention.

Referring initially to FIG. 1, a high-level block diagram of a data processing system, generally designated 10, is shown in which the present invention may be implemented. The system 10 in one non-limiting embodiment is a personal computer or laptop computer. The system 10 includes a processor 12, which may be, without limitation, a X86 processor available from Intel Corporation (or other processors common to the industry). The processor 12 is connected to a processor bus 14, and a cache 16, which is used to stage data to and from the processor 12 at reduced access latency, is also connected to the processor bus 14. In non-limiting embodiments the processor 12 can access data from the cache 16 or from a system solid state memory 18 by way of a memory controller function 20. The cache 16 may include volatile zmemory such as DRAM and the memory 18 may include non-volatile memory such as flash memory. Also, the memory controller 20 is connected to a memory-mapped graphics adapter 22 by way of a graphic bus controller 24, and the graphics adapter 22 provides a connection for a monitor 26 on which the user interface of software executed within data processing system 10 is displayed.

The non-limiting memory controller 20 may also be connected to a personal computer interface (PCI) bus bridge 28, which provides an interface to a PCI bus 30. Connected to the PCI bus 30 may be an input/output (I/O) controller 32 for controlling various I/O devices, including, e.g., a keyboard/mouse adapter 34 which provides connection to a keyboard 36 and to a pointing device 38, which may be implemented by a mouse, trackball, or the like. Additionally, a hard disk drive 40 is connected to the I/O controller 32. As is known in the art, the HDD 40 includes a controller that can access a master booth record (MBR) which can contain executable code as well as tabular data structures. If desired, an optical disk drive 42, such as a DVD or CD drive, can be connected to the I/O controller 32. In some implementations a network adapter 44 can be attached to the PCI bus 30 as shown for connecting the data processing system 10 to a local area network (LAN), the Internet, or both. In any case, in accordance with principles known in the art, during power-on the processor 12 executes a basic input/output system (BIOS) program 46 that may be stored in the memory 18, to load an operating system in the hard disk drive 40 into the memory 18.

Figure 2:
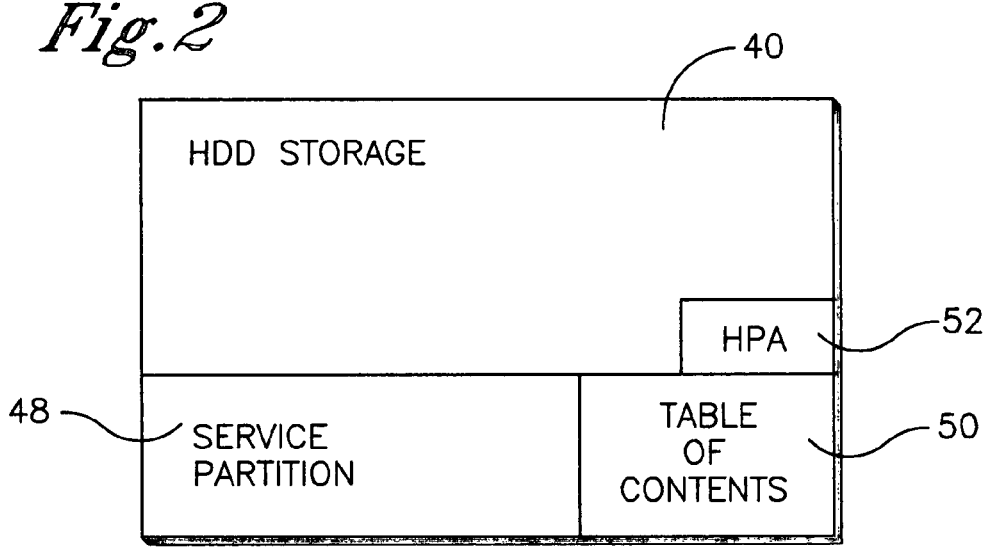
FIG. 2 shows a non-limiting hard disk drive (HDD) of the present invention.

Now referring to FIG. 2, the HDD 40 is shown. The HDD 40 may include a service partition 48. The service partition 48 can be used to store original system files, such as an original version of the personal computer's operating system which is loaded onto the solid state memory 18 upon each new system startup. The HDD 40 may also include a table of contents (TOC) 50 which allows the user to manipulate certain aspects of the service partition 46.

The HDD 40 can also include a hidden partition area (HPA) 52 in which certain vital data may be stored. The TOC 50 may contain a list of various sectors within the HPA 52. Further, the HPA 52 is typically at the beginning or end of the disk. For example, an HPA 52 can contain a compressed image of the main operating system that is located elsewhere on the disk, so that the user is given the opportunity to recover the main operating system using the compressed version in the HPA 52 in the event that, for instance, the main operating system becomes corrupted with a virus. The compressed version of the operating system may be an initial operating system version or a backup version of the user's computing environment, but in any case it resides in the HPA 52. When the special key (e.g., F11) is depressed during booting, the user is given access to the HPA 52 for booting the operating system and, thus, gaining access to a backup of the user's operating system in a compressed image.

Figure 3:
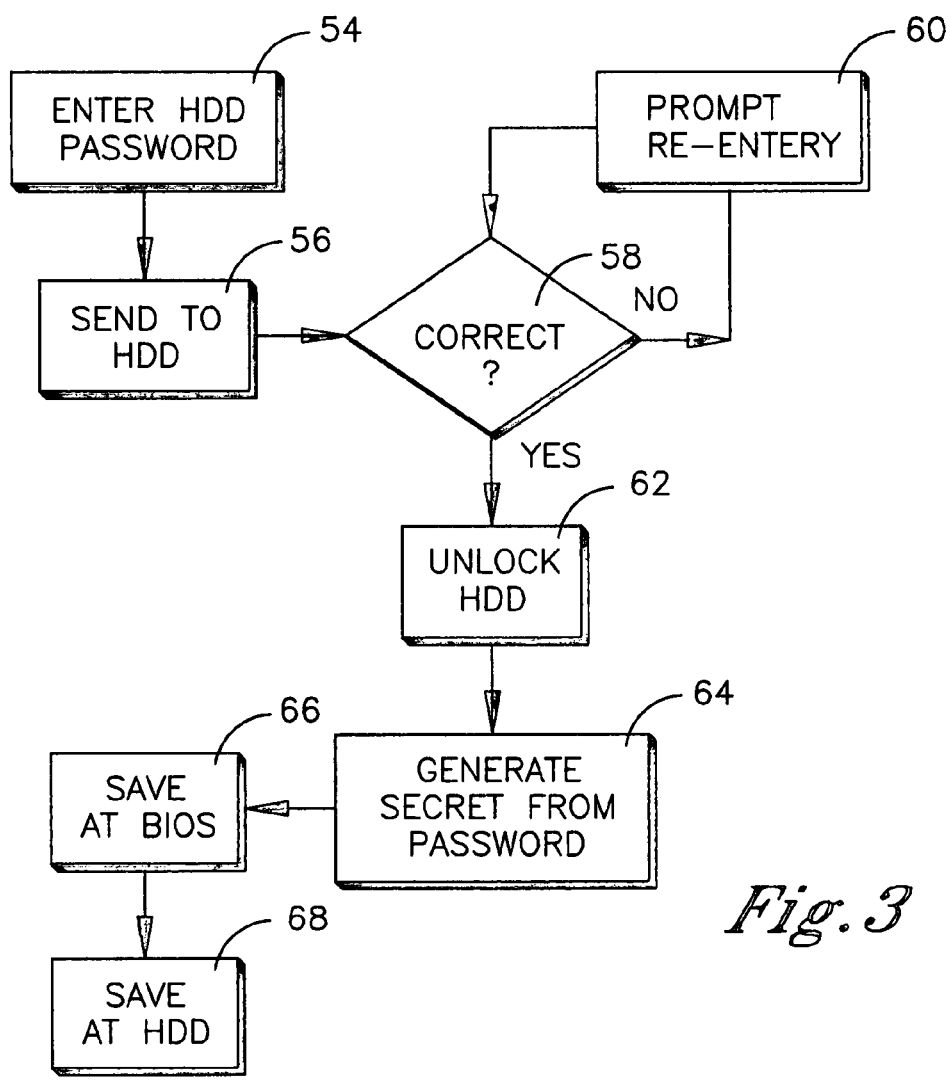

Moving on, the logic for the invention is presented in FIGS. 3 and 4. FIG. 3 outlines the process for creating a one time password after a new system startup, sometimes referred to as a "cold boot." This one time password is then used when the personal computer returns from a suspended state so that the user password will not be accessible to unauthorized users.

The logic showing the process for securing the password when coming out of the suspended state is shown in FIG. 4. The "suspended" or "suspend" state typically is entered when, e.g., the computer detects the elapse of a period of no user input. To this end, a clock 53 (FIG. 1) may be accessible to the processor 12, and the main operating system of the computer enters a low power consumption suspend state after a period of non-use.

Beginning FIG. 3 at block 54, a user enters the correct password into the BIOS 46, the password being necessary to unlock the HDD 40. At block 56, the BIOS 46 sends the password to the HDD 40. The HDD 40 evaluates the password and at decision diamond 58 the logic determines whether the correct password has been entered. If the correct password has not been entered, the logic moves to block 60 where the user is prompted to enter a password again. If the correct password has been entered, the logic skips to block 62 where the HDD 40 is made available to the user.

The logic then moves to block 64, where the BIOS 46 generates a secret. In one preferred but non-limiting implementation, the secret is a random number or counter that is derived from the password and that cannot be accessed by any program other than BIOS. When a random number is implemented, the random number is generated using a random number generating algorithm. In any case, however derived, the secret when combined with the password yields an initial one-time password. Moving to block 66, the BIOS 46 saves the secret and the one-time password and transmits these data elements to the HDD 40. Concluding at block 68, the HDD 40 saves the secret and the one-time password.

FIG. 4 provides the logic for protecting the user password from being exposed to an unauthorized user while exiting the suspended state. Beginning at block 70 the suspend state is exited by, e.g., moving the mouse. At block 72, the BIOS 46 runs the algorithm that was used to generate the one-time password against the previous one-time password and the secret saved from the most recent system startup to generate a new one-time password prior to placing the password on the bus to send it to the HDD. At block 74 the HDD 40 also runs the same algorithm against the prior one-time password it has stored in its memory and the secret that was saved during the most recent system startup. The one-time password generated from the algorithm performed by the BIOS 46 is sent to the HDD 40.

At decision diamond 78 it is determined whether the new one-time password generated by the BIOS 46 is identical to the one generated by the HDD 40. If they are not identical, at block 80 the personal computer remains in its suspended state and the HDD 40 remains locked. Depending on predetermined specifications, the HDD 40 may either stay locked or the BIOS 46 may again prompt the user to enter the correct password. However, if the numbers are identical the logic moves to block 82 where the personal computer exits the suspended state and the HDD 40 is unlocked. The one-time password is saved by both the HDD and BIOS and combined with the secret the next time it is desired to leave the suspend state.

It may now be appreciated that with the present invention, should an unauthorized user monitor the PCI bus 30, the eavesdropper will only be able to acquire a one-time password that will not be used again. The next time the personal computer exits the suspended state, the old one-time password is combined with the secret by both BIOS and the HDD to render a new one-time password so that any prior one-time password obtained by the unauthorized user will not provide access the personal computer, including the HDD 40.

Concluding at block 84, the BIOS 46 and the HDD 40 save the new one-time password for future calculations. Subsequently, when the computer is completely turned off instead of reentering the suspended state, the secret saved in the BIOS 46 and the HDD 40 is no longer needed. It may be deleted or kept for future reference. Regardless, a new secret is generated the next time the personal computer is started from a "cold boot," as previously outlined in FIG. 3.

While the particular SYSTEM AND METHOD FOR PROTECTING DISK DRIVE PASSWORD WHEN BIOS CAUSES COMPUTER TO LEAVE SUSPEND STATE is herein shown and described in detail, it is to be understood that the subject matter which is encompassed by the present invention is limited only by the claims.

What is claimed is:

1. A method comprising:
   combining, with a secret to render a first one-time password, a user password for unlocking a hard disk drive (HDD) associated with a computer;
   storing the first one-time password and secret with a basic input-output system (BIOS) associated with the computer;
   storing the first one-time password and secret on the HDD;
   in response to the computer emerging from a suspend state at a first time, at the BIOS combining the first one-time password with the secret to render a second one-time password;
   sending the second one-time password to the HDD;
   at the HDD, combining the first one-time password with the secret to render a second one-time password; and
   only if the second one-time password received by the HDD from BIOS matches the second one-time password generated by the HDD, permitting access to the HDD.

2. The method of claim 1, comprising storing the second one-time password.

3. The method of claim 2, comprising, in response to the computer emerging from a suspend state at a second time, at the BIOS combining the second one-time password with the secret to render a third one-time password;
   sending the third one-time password to the HDD;
   at the HDD, combining the second one-time password with the secret to render a third one-time password; and
   only if the third one-time password received by the HDD from BIOS matches the third one-time password generated by the HDD, permitting access to the HDD.

4. The method of claim 3, wherein the suspend state at the second time is the next temporally successive suspend state after the suspend state at the first time.

5. A computer, comprising:
   at least one HDD;
   at least one operating system configured to enter a suspend state upon the elapse of a period of no user input;
   the operating system configured to exit the suspend state in response to at least one user input signal;
   data on the HDD being accessible in response to the operating system exiting the suspend state only upon proper reception by the HDD of a one-time password, the one-time password subsequently not being useful for rendering data on the HDD accessible when the operating system exits subsequent suspend states.

6. The computer of claim 5, wherein a secret is combined with a HDD password to render a first one-time password that is stored with the secret with a basic input-output system (BIOS) associated with the computer, the first one-time password and secret also being stored on the HDD.

7. The computer of claim 6, wherein in response to the computer emerging from a suspend state at a first time, the BIOS combines the first one-time password with the secret to render a second one-time password and sends the second one-time password to the HDD.

8. The computer of claim 7, wherein the HDD combines the first one-time password with the secret to render a second one-time password and only if the second one-time password received by the HDD from BIOS matches the second one-time password generated by the HDD, permits access to data on the HDD.

9. The computer of claim 8, wherein the second one-time password is stored.

10. The computer of claim 9, wherein in response to the computer emerging from a suspend state at a second time, the BIOS combines the second one-time password with the secret to render a third one-time password and sends the third one-time password to the HDD.

11. The computer of claim 10, wherein the HDD combines the second one-time password with the secret to render a third one-time password and only if the third one-time password received by the HDD from BIOS matches the third one-time password generated by the HDD, permits access to data on the HDD.

12. The computer of claim 11, wherein the suspend state at the second time is the next temporally successive suspend state after the suspend state at the first time.

13. A computer system, comprising:
    an operating system programmed with means for entering a suspend state upon at least one predetermined criterion being met;
    a hard disk drive (HDD); and
    means for permitting access to the HDD when the operating system emerges from a first suspend state but not from a second suspend state after the first suspend state.

14. The system of claim 13, wherein the means for permitting is a one-time password.

15. The system of claim 14, wherein a first one-time password is generated when a secret is combined with a HDD password, the first one-time password being stored with the secret with a basic input-output system (BIOS) associated with the computer system, the first one-time password and secret also being stored on the HDD.

16. The system of claim 15, wherein in response to the computer emerging from a suspend state at a first time, the BIOS combines the first one-time password with the secret to render a second one-time password and sends the second one-time password to the HDD.

17. The system of claim 16, wherein the HDD combines the first one-time password with the secret to render a second one-time password and only if the second one-time password received by the HDD from BIOS matches the second one-time password generated by the HDD, permits access to data on the HDD.

18. The system of claim 17, wherein the second one-time password is stored.

19. The system of claim 18, wherein in response to the computer emerging from a suspend state at a second time, the BIOS combines the second one-time password with the secret to render a third one-time password and sends the third one-time password to the HDD.

20. The system of claim 19, wherein the HDD combines the second one-time password with the secret to render a third one-time password and only if the third one-time password received by the HDD from BIOS matches the third one-time password generated by the HDD, permits access to data on the HDD.

* * * * *